(12) United States Patent
Yu et al.

(10) Patent No.: US 10,908,178 B1
(45) Date of Patent: Feb. 2, 2021

(54) ARBITRARY-SHAPED FABRICATED TEST BLOCK FOR HIGH- STEEP SLOPE ROLLING STONE TEST

(71) Applicant: Southwest Jiaotong University, Chengdu (CN)

(72) Inventors: Zhixiang Yu, Chengdu (CN); Hu Xu, Chengdu (CN); Linxu Liao, Chengdu (CN); Xin Qi, Chengdu (CN); Lei Zhao, Chengdu (CN); Shichun Zhao, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 17/008,666

(22) Filed: Sep. 1, 2020

(30) Foreign Application Priority Data

Sep. 30, 2019 (CN) .......................... 2019 1 0939945

(51) Int. Cl.
| | |
|---|---|
| *G01P 15/00* | (2006.01) |
| *G01P 3/00* | (2006.01) |
| *B33Y 80/00* | (2015.01) |
| *B64C 39/02* | (2006.01) |
| *G01B 11/24* | (2006.01) |

(52) U.S. Cl.
CPC .............. *G01P 15/00* (2013.01); *B33Y 80/00* (2014.12); *B64C 39/024* (2013.01); *G01B 11/24* (2013.01); *G01P 3/00* (2013.01); *B64C 2201/12* (2013.01)

(58) Field of Classification Search
CPC . G01P 15/00; G01P 3/00; B33Y 80/00; B64C 39/024; B64C 2201/12; G01B 11/24

USPC .......................................................... 73/493
See application file for complete search history.

(56) References Cited

U.S. PATENT DOCUMENTS

| | | | | |
|---|---|---|---|---|
| 4,730,497 | A * | 3/1988 | Rabensteiner | G01L 1/2218 73/768 |
| 5,564,557 | A * | 10/1996 | Spencer | B65G 39/12 198/525 |
| 6,619,136 | B2 * | 9/2003 | Basile | G01L 5/0047 73/760 |

(Continued)

FOREIGN PATENT DOCUMENTS

| | | |
|---|---|---|
| CN | 104183182 A | 12/2014 |
| CN | 104807685 A | 7/2015 |

(Continued)

*Primary Examiner* — Roy M Punnoose
(74) *Attorney, Agent, or Firm* — Bayramoglu Law Offices LLC (57) ABSTRACT

An arbitrary-shaped fabricated test block for a high-steep slope rolling stone test includes a connecting square barrel and test block bodies. The connecting square barrel is formed by enclosing steel plates, the steel plates are provided with connecting grooves on a periphery of the steel plates, and the connecting grooves are provided with connecting groove bolt holes. The test block bodies are printed on printing bases by 3D printing technology, connecting plates are fixedly arranged on the printing bases, connecting plate bolt holes are formed in the connecting plates, and high-strength bolts penetrate through the connecting groove bolt holes and the connecting plate bolt holes to connect the test block bodies to the connecting square barrel. A sensor box is fixedly arranged on an inner side of the connecting square barrel, and a sensor is arranged in the sensor box.

14 Claims, 5 Drawing Sheets

(56) References Cited

U.S. PATENT DOCUMENTS

| 2015/0338327 | A1* | 11/2015 | Pittam | G01N 3/303 |
|---|---|---|---|---|
| | | | | 73/12.13 |
| 2017/0030701 | A1* | 2/2017 | Saxey | G01B 7/18 |
| 2017/0059423 | A1* | 3/2017 | Suzuki | G01L 1/225 |

FOREIGN PATENT DOCUMENTS

| CN | 104819874 | A | 8/2015 |
|---|---|---|---|
| CN | 105424441 | A | 3/2016 |
| CN | 105904573 | A | 8/2016 |
| CN | 207280720 | U | 4/2018 |
| KR | 20140062840 | A | 5/2014 |

\* cited by examiner

ARBITRARY-SHAPED FABRICATED TEST BLOCK FOR HIGH- STEEP SLOPE ROLLING STONE TEST

CROSS-REFERENCE TO RELATED APPLICATION

This application is based upon and claims priority to Chinese Patent Application No. 201910939945.2, filed on Sep. 30, 2019, the entire contents of which are incorporated herein by reference.

TECHNICAL FIELD

The invention relates to the field of slope protection test, and in particular to an arbitrary-shaped fabricated test block for high-steep slope rolling stone test.

BACKGROUND

Slope geological disaster prevention is a major problem to be solved in highway, railway engineering, etc. Collapse, rockfall, debris flow and other disasters can easily lead to engineering accidents in the course of construction, which will not only block traffic, but also impact traveling vehicles, seriously endangering people's lives and property. Moreover, the probability of geological disasters occurring on high-steep slopes is higher, resulting in more serious harm. At present, the high-steep slope protection net studied can effectively prevent the falling and rolling of collapsed rock masses, thus achieving the purpose of slope protection. Whether the slope protection net can withstand the impact and effectively prevent the rock masses from falling and rolling down requires a lot of tests. At present, the impact test block used in the test has fixed shape and size, is monotonous in material selection, and is directly cast with reinforced concrete, which cannot highly simulate the real situation of rock masses, resulting in a large deviation between the test process and the real situation, and the test results are not accurate enough. At present, the sensor carried by the impact test block used in the test is often directly fixed on the surface of the test block or simply placed in holes formed in the test block. The sensor and the test block are not connected as a whole, so that relative displacement between the sensor and the test block is easy to occur during the test, resulting in inaccurate test data. In addition, because of the high impact energy and strong destructiveness in the high-steep slope test, the sensor and sensor data acquisition instruments are susceptible to damage due to lack of good protection measures, resulting in a sharp increase in the cost of the high-steep slope rolling stone test. Furthermore, when testing on high-steep slopes, the requirements for testing equipment are very high, and the test blocks used in large-scale tests are often very bulky. At present, the impact test blocks used in tests are integrally cast, and the troubles brought by hoisting and transportation have become a difficult problem that cannot be ignored.

SUMMARY

It is an object of the invention to provide an arbitrary-shaped fabricated test block for high-steep slope rolling stone test, which mainly solves the defects in the prior art that the test block cannot accurately simulate the impact effect of rolling stone, a sensor cannot accurately read and is highly susceptible to damage, and the hoisting and transportation are troublesome.

In order to achieve the above object, the technical solution adopted by the invention is as follows:

an arbitrary-shaped fabricated test block for high-steep slope rolling stone test, including a connecting square barrel and test block bodies;

the connecting square barrel is enclosed by steel plates, the steel plates are provided with connecting grooves on their periphery, and the connecting grooves are provided with connecting groove bolt holes;

the test block bodies are printed on printing bases by 3D printing technology, connecting plates are fixedly arranged on the printing bases, connecting plate bolt holes are formed in the connecting plates, and high-strength bolts penetrate through the connecting groove bolt holes and the connecting plate bolt holes to connect the test block bodies to the connecting square barrel;

a sensor box is fixedly arranged on an inner side of the connecting square barrel, and a sensor is arranged in the sensor box; and the test block bodies can be 3D printed, according to design requirements, into several test blocks with different shapes, materials and sizes on different printing bases to reproduce the appearance of falling stones.

Further, the connecting square barrel is enclosed and welded into a rectangular barrel body by four steel plates, each side surface of the rectangular barrel body is provided with four connecting grooves, and the connecting grooves are formed by welding two steel plates on the rectangular barrel body.

Further, an unmanned aerial vehicle is used to perform field scanning of dangerous rocks, boulders, etc., that are easy to roll off for later processing and segmenting into blocks by a computer. Proper materials are selected according to the physical properties of the stones, and test block bodies are printed using the 3D printing technology. 3D printing materials are determined by actually measured rock mass materials.

Further, the printing bases includes a rectangular 3D printing base made of a steel plate, and an L-shaped 3D printing base welded from two steel plates. In order to increase the strength and the connection stability, the printing bases are further provided with steel bar net, reinforcing steel bars and additional steel bars.

Further, the 3D printing materials include gypsum, resin and cement.

Further, the rectangular 3D printing base is provided with a test block body on one side and connecting plates on the other side; and the L-shaped 3D printing base is provided with test block bodies on both outer sides of the L-shape and connecting plates on one inner side of the L-shape.

Further, the printing base is further provided with steel bar net, reinforcing steel bars and additional steel bars. The connecting plates and the connecting grooves are matched and can be connected and reinforced by high-strength bolts.

Further, the sensor box has a structure including:

a sensor base provided with a mounting hole, a sensor data acquisition instrument and a base screw being fixedly arranged on the sensor base;

a sensor box cover connected with a sensor box body by a hinge, the sensor box cover and the sensor box body being fixed by a pin;

a sensor box bottom fixedly provided with a box bottom screw, the box bottom screw passing through the mounting hole of the sensor base and being fixed by a nut.

Further, the sensor includes a speed sensor and an acceleration sensor.

Further, the sensor is self-threaded and screwed with the base screw.

The invention has that follow beneficial effects:

According to the invention, an unmanned aerial vehicle is used for field scanning of test target rock masses such as dangerous rocks and boulder for later processing and segmenting into blocks by a computer, and then the segmented test blocks are printed using the 3D printing technology and integrally connected by the connecting square barrel to reproduce the shapes and sizes of the target rock masses to the greatest extent. According to the invention, the test block bodies are manufactured by 3D printing, and the target rock masses in the real simulation condition can be used as a reference for material selection, so as to select the materials most similar to the target rock masses for manufacturing. The test blocks of present invention are close to the real situation of rock masses in size, shape and material, thereby more accurately simulating the impact effect of rolling stones.

In addition, in the present invention, the sensor, the sensor data acquisition instrument and the test blocks are connected into a whole by the connecting square barrel, the sensor box and the sensor base, ensuring that the sensor and the test block have the same movement state, so that the measurement results are more accurate. Meanwhile, in the present invention, the sensor and the sensor data acquisition instrument are skillfully protected by the sensor box, so that the service life of the sensor and the sensor data acquisition instrument can be effectively prolonged, thereby reducing the cost of the high-steep slope rolling stone test.

Further, in the high-steep slope test, the test blocks and the connecting square barrel can be hoisted first and then spliced together, thus solving the hoisting problem of large test blocks on high-steep slope terrain. The present invention has the advantages of strong simulation ability, ingenious design, low cost, safety and reliability, wide market application prospects, and is suitable for popularization and application.

In the above drawings, the names of the parts corresponding to the reference numerals are as follows: 1—connecting square barrel, 2—sensor box, 3—connecting groove, 4—connecting groove bolt hole, 5—test block body, 6—connecting plate, 7—rectangular 3D printing base, 8—L-shaped 3D printing base, 9—connecting plate bolt hole, 10—high-strength bolt, 11—steel bar net, 12—reinforcing steel bar, 13—additional steel bar, 14—sensor base, 15—mounting hole, 16—sensor data acquisition instrument, 17—base screw, 18—sensor box body, 19—sensor box cover, 20—hinge, 21—pin, 22—box bottom screw, 23—sensor box bottom, 24—nut, and 25—sensor.

DETAILED DESCRIPTION OF THE EMBODIMENTS

The present invention will be further described below with reference to the accompanying drawings and embodiments, and embodiments of the present invention include but are not limited to the following embodiments.

Figure 1:
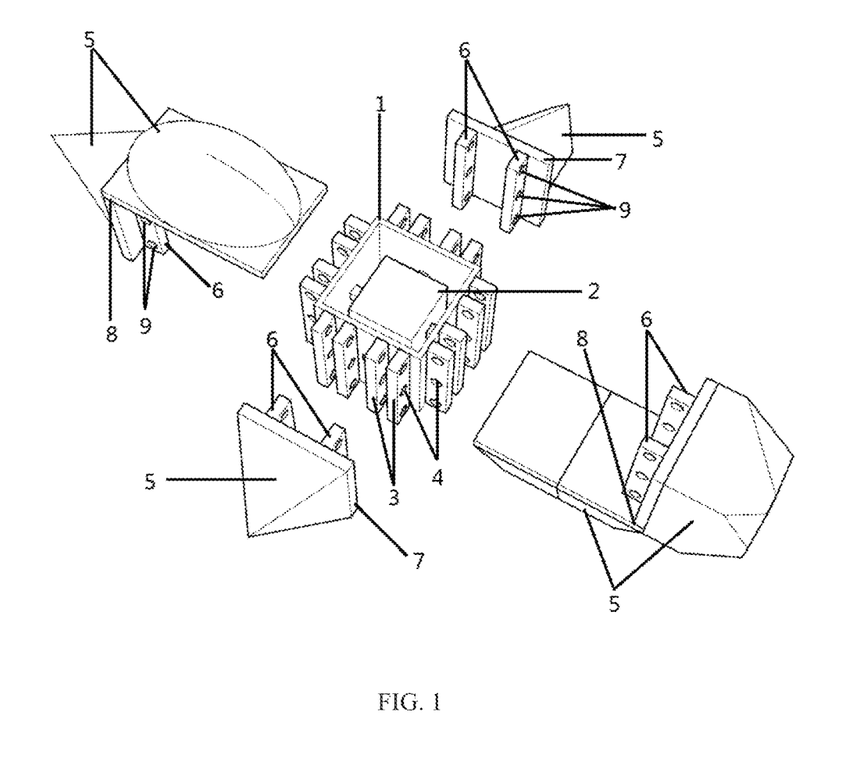
FIG. 1 is an exploded schematic diagram of an arbitrary-shaped fabricated test block for high-steep slope rolling stone test according to the present invention.

As shown in FIG. 1, an arbitrary-shaped fabricated test block for high-steep slope rolling stone includes a connecting square barrel (1) welded from steel plates, a sensor box (2) welded in the connecting square barrel, connecting grooves (3) welded outside the connecting square barrel, connecting groove bolt holes (4) formed in the connecting grooves, 3D printed test blocks (5) with different shapes and sizes, connecting plates (6) for connecting the test blocks and the connecting square barrel, a rectangular 3D printing base (7) or an L-shaped 3D printing base (8) for connecting the test blocks and the connecting plates (6), and connecting plate bolt holes (9) formed in the connecting plates (6).

Figure 2:
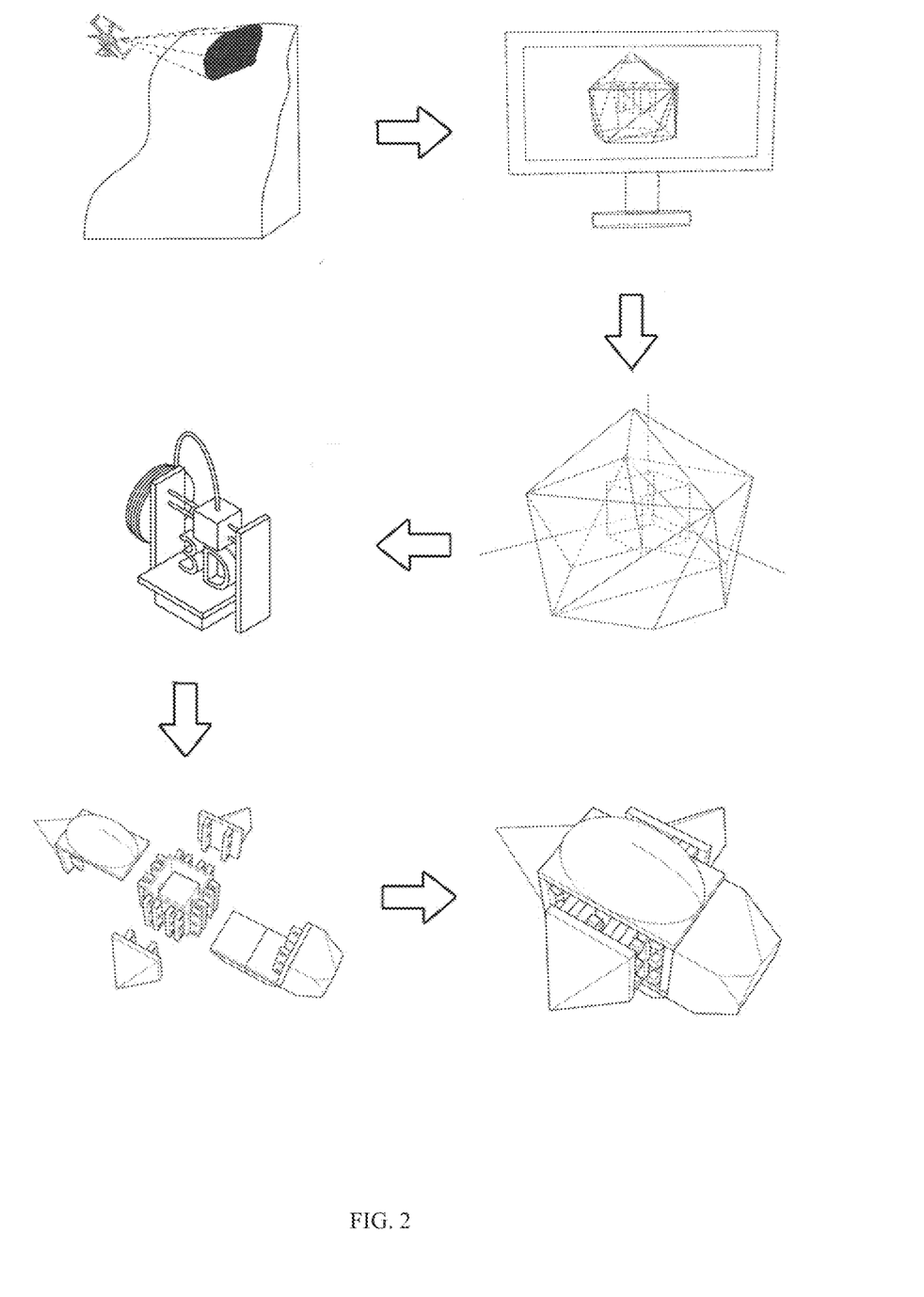
FIG. 2 is a schematic diagram of an example of use of the arbitrary-shaped fabricated test block for high-steep slope rolling stone test according to the present invention.

As shown in FIG. 2, an unmanned aerial vehicle is used to perform field scanning of dangerous rocks, boulders, etc., that are easy to roll off for later processing and segmenting into blocks by a computer. Proper materials, for example, gypsum-like, resin, cement, etc., are selected according to the physical properties of the stones, and test blocks are printed using the 3D printing technology. The test blocks are connected and spliced together with the connecting square barrel (1) through the connecting plates (6) to reproduce the appearance of the falling stones for better performing the simulation test. Therefore, the shape, size and material selection of the fabricated test block in this embodiment cannot be regarded as a limitation to the present invention. It is understood that the shape of the test block is not specific and may be of any shape.

Figure 3:
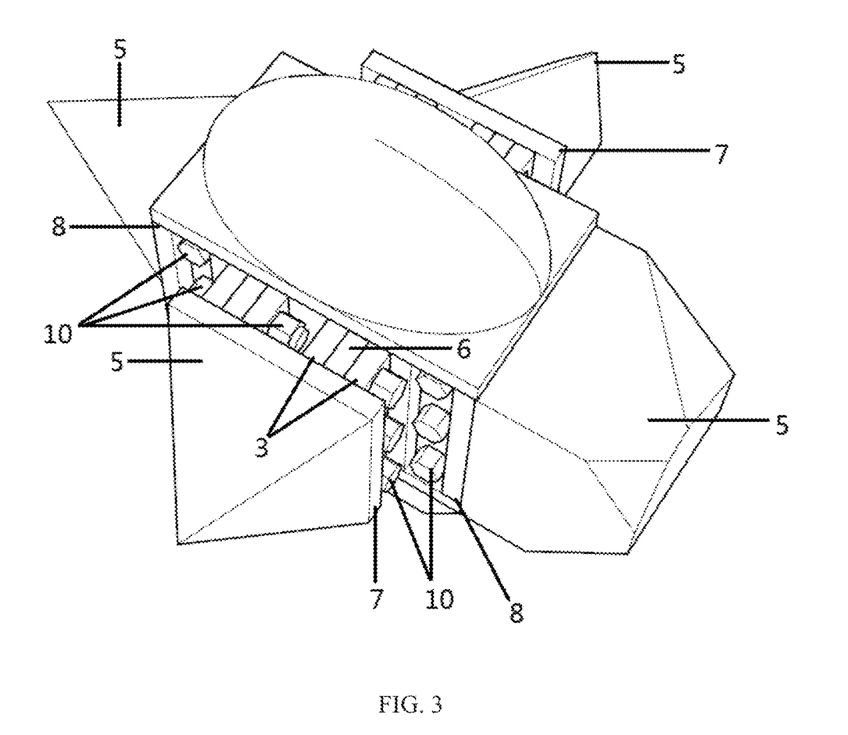
FIG. 3 is a schematic structural diagram of the arbitrary-shaped fabricated test block for high-steep slope rolling stone test after fabrication according to the present invention.

As shown in FIG. 3, in order to ensure that the connecting grooves and the connecting plates (6) are securely and stably connected, the connecting groove bolt holes (4) in the connecting groove and the connecting plate bolt holes (9) in the connecting plate (6) are connected by high-strength bolts (10). The connecting plates (6) are welded and fixed with the rectangular 3D printing base (7) or the L-shaped 3D printing base (8).

Figure 4:
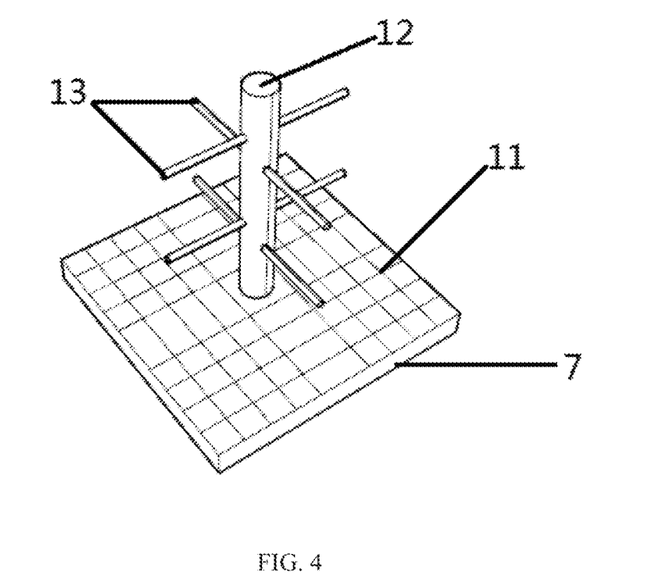
FIG. 4 is a schematic diagram of a rectangular 3D printing base of the arbitrary-shaped fabricated test block for high-steep slope rolling stone test according to the present invention.

As shown in FIG. 4, in order to ensure the connection between the 3D printed test blocks and the connecting plates (6) and to enhance the strength of the test blocks, the rectangular 3D printing base (7) or the L-shaped 3D printing base (8) is made of steel plates. Further, in order to increase the strength and improve the connection stability, the printing bases (7, 8) are also provided with a steel bar net (11), reinforcing steel bars (12) and additional steel bars (13).

Figure 5:
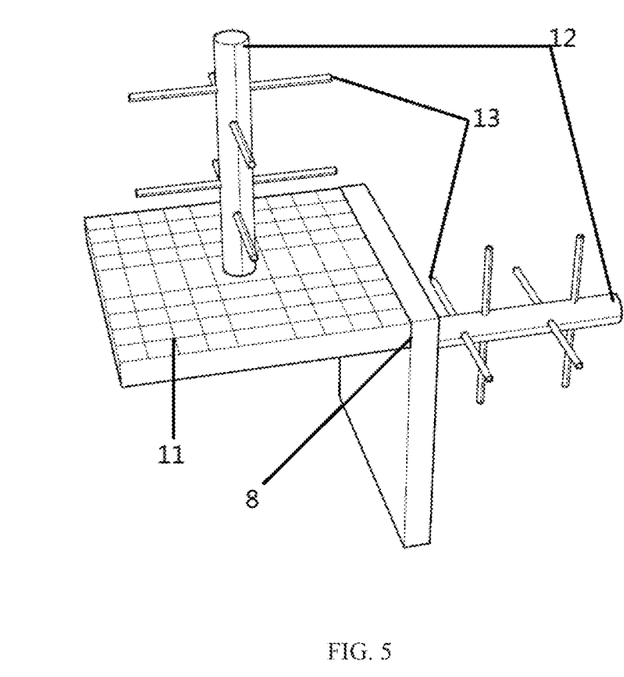
FIG. 5 is a schematic diagram of an L-shaped 3D printing base of the arbitrary-shaped fabricated test block for high-steep slope rolling stone test according to the present invention.

As shown in FIG. 5, in order to facilitate connection with the sensor box, four mounting holes (15) are formed in the sensor base (14). In order to measure data more accurately, the sensor data acquisition instrument (16) and the base screw (17) are welded on the sensor base.

Figure 6:
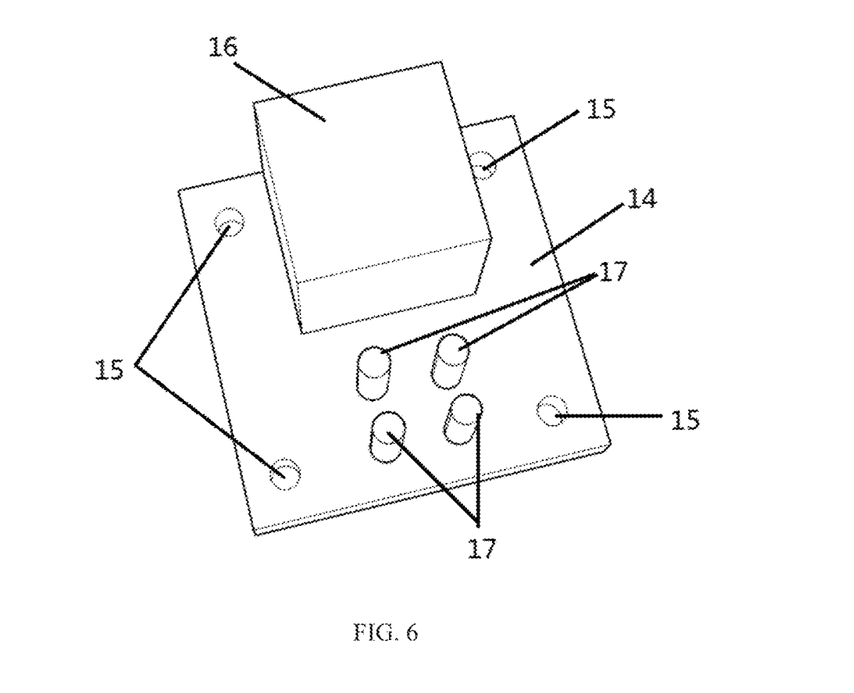
FIG. 6 is a schematic diagram of a sensor base of the arbitrary-shaped fabricated test block for high-steep slope rolling stone according to the present invention.

As shown in FIG. 6, in order to better protect the sensor and facilitate the data reading, disassembly and maintenance of the sensor, the box body (18) and the box cover (19) of the sensor box are connected by a hinge (20) to form a sensor box with a cover, and the sensor box is closed by the cover using a bolt (21). At the same time, four box bottom screws (22) are welded at the box bottom for connecting the sensor base. In an alternative embodiment, the sensor box is welded with the connecting square barrel (1) to ensure that the sensor (25) and the test block form a whole without relative displacement.

Figure 7:
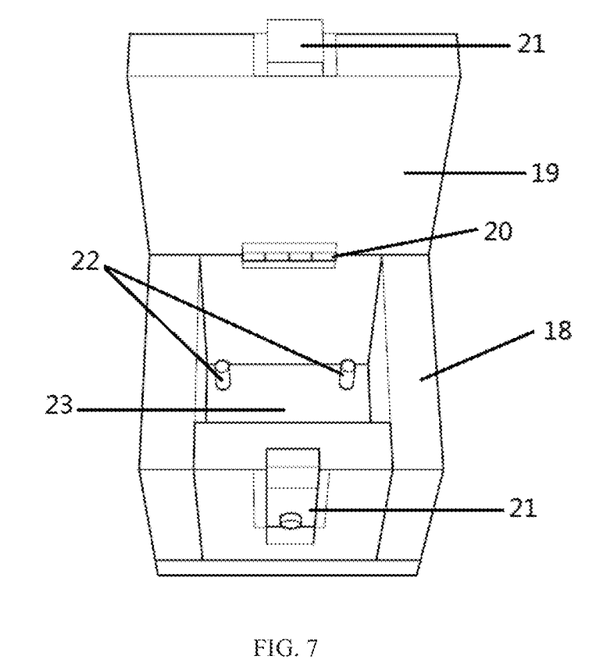
FIG. 7 is a schematic diagram of a sensor box of the arbitrary-shaped fabricated test block for high-steep slope rolling stone according to the present invention.
Figure 8:
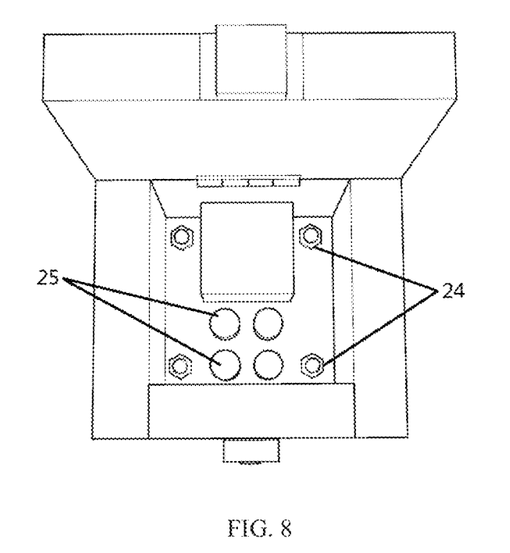
FIG. 8 is a schematic diagram of the sensor box, a sensor base and a sensor after fabrication of the arbitrary-shaped fabricated test block for high-steep slope rolling stone according to the present invention.

As shown in FIGS. 7-8, the sensor base is connected with the screws at the bottom of the sensor box through the mounting holes by using nuts (24). Such a connection ensures that the sensor box is tightly connected with the sensor base with no relative displacement occurring between the sensor base and the sensor box during the test. At the same time, this connection makes the sensor base more convenient to disassemble, thus making the data reading and maintenance of the sensor data acquisition instrument welded on the sensor base more convenient. The sensor (25) is self-threaded and screwdriver with the base screw (17). Such a connection ensures a tight connection between the sensor and the sensor base with no relative displacement occurring therebetween during the test, thus ensuring that the sensor and the test block are connected as a whole to have the same speed and acceleration, which in turn ensures the accuracy of sensor readings. In addition, this connection makes the disassembly and maintenance of the sensor more convenient.

For convenience of testing, the sensor at least includes a speed sensor and an acceleration sensor for detecting test data.

The arbitrary-shaped fabricated test block for high-steep slope rolling stone test according to the application can be separately transported and hoisted before being fabricated during the test.

According to the above embodiments, the present invention can be well implemented. It should be noted that, on the premise of the above design principles, in order to solve the same technical problems, even if some insubstantial changes or embellishments are made on the basis of the contents disclosed in the present invention, the substance of the adopted technical solution is still the same as that of the present invention, and therefore should also be within the protection scope of the present invention.

The invention claimed is:

1. An arbitrary-shaped fabricated test block for a high-steep slope rolling stone test, comprising a connecting square barrel and a plurality of test block bodies
   the connecting square barrel is formed by enclosing a plurality of steel plates, the plurality of steel plates are provided with a plurality of connecting grooves on a periphery of the plurality of steel plates, and the plurality of connecting grooves are provided with a plurality of connecting groove bolt holes;
   the plurality of test block bodies are printed on a plurality of printing bases by a 3D printing technology, a plurality of connecting plates are fixedly arranged on the plurality of printing bases, a plurality of connecting plate bolt holes are formed in the plurality of connecting plates, and a plurality of bolts penetrate through the plurality of connecting groove bolt holes and the plurality of connecting plate bolt holes to connect the plurality of test block bodies to the connecting square barrel;
   a sensor box is fixedly arranged on an inner side of the connecting square barrel, and a sensor is arranged in the sensor box; and
   the plurality of test block bodies are printed by the 3D printing technology according to design requirements, into a plurality of test blocks with different shapes, materials and sizes on a plurality of different printing bases, and the plurality of test blocks are configured to simulate appearances of a plurality of falling stones.

2. The arbitrary-shaped fabricated test block according to claim 1, wherein the connecting square barrel is enclosed and welded into a rectangular barrel body by four steel plates, each side surface of the rectangular barrel body is provided with four connecting grooves, and the four connecting grooves are formed by welding the four steel plates on the rectangular barrel body.

3. The arbitrary-shaped fabricated test block according to claim 2, wherein an unmanned aerial vehicle is used to perform field scanning of a plurality of mountain stones, wherein the plurality of mountain stones are prone to rolling down and a computer processes and segments the plurality of mountain stones into a plurality of blocks, a material of the plurality of test block bodies is selected according to physical properties of the plurality of mountain stones, and the plurality of test block bodies are printed by using the 3D printing technology, and a plurality of 3D printing materials are determined by a plurality of actually measured rock mass materials.

4. The arbitrary-shaped fabricated test block according to claim 2, wherein the plurality of printing bases comprise a rectangular 3D printing base and an L-shaped 3D printing base.

5. The arbitrary-shaped fabricated test block according to claim 2, wherein the plurality of printing bases are further provided with a steel bar net, a plurality of reinforcing steel bars and a plurality of additional steel bars.

6. The arbitrary-shaped fabricated test block according to claim 2, wherein the sensor box comprises:
   a sensor base, wherein the sensor base is provided with a mounting hole, and a sensor data acquisition instrument and a base screw are fixedly arranged on the sensor base;
   a sensor box cover, wherein the sensor box cover is connected to a sensor box body by a hinge, and the sensor box cover and the sensor box body are fixed by a pin; and
   a sensor box bottom, wherein the sensor box bottom is fixedly provided with a box bottom screw, and the box bottom screw passes through the mounting hole of the sensor base and is fixed by a nut.

7. The arbitrary-shaped fabricated test block according to claim 1, wherein an unmanned aerial vehicle is used to perform field scanning of a plurality of mountain stones, wherein the plurality of mountain stones are prone to rolling down and a computer processes and segments the plurality of mountain stones into a plurality of blocks, a material of the plurality of test block bodies is selected according to physical properties of the plurality of mountain stones, and the plurality of test block bodies are printed by using the 3D printing technology, and a plurality of 3D printing materials are determined by a plurality of actually measured rock mass materials.

8. The arbitrary-shaped fabricated test block according to claim 7, wherein the plurality of 3D printing materials comprise gypsum, resin and cement.

9. The arbitrary-shaped fabricated test block according to claim 1, wherein the plurality of printing bases comprise a rectangular 3D printing base and an L-shaped 3D printing base.

10. The arbitrary-shaped fabricated test block according to claim 9, wherein the rectangular 3D printing base is provided with a test block body of the plurality of test block bodies on a first side and the plurality of connecting plates on a second side; and the L-shaped 3D printing base is provided with the plurality of test block bodies on both outer sides of an L-shape and the plurality of connecting plates on one inner side of the L-shape.

11. The arbitrary-shaped fabricated test block according to claim 1, wherein the plurality of printing bases are further provided with a steel bar net, a plurality of reinforcing steel bars and a plurality of additional steel bars.

12. The arbitrary-shaped fabricated test block according to claim 1, wherein the sensor box comprises:

- a sensor base, wherein the sensor base is provided with a mounting hole, and a sensor data acquisition instrument and a base screw are fixedly arranged on the sensor base;
- a sensor box cover, wherein the sensor box cover is connected to a sensor box body by a hinge, and the sensor box cover and the sensor box body are fixed by a pin; and
- a sensor box bottom, wherein the sensor box bottom is fixedly provided with a box bottom screw, and the box bottom screw passes through the mounting hole of the sensor base and is fixed by a nut.

13. The arbitrary-shaped fabricated test block according to claim 12, wherein the sensor comprises a speed sensor and an acceleration sensor.

14. The arbitrary-shaped fabricated test block according to claim 12, wherein the sensor is self-threaded and screwed with the base screw.

* * * * *